Nov. 17, 1953   L. O. WIESE   2,659,332
WELDING JIG FOR REPAIRING PLOWSHARES
Filed Nov. 12, 1949   2 Sheets-Sheet 1
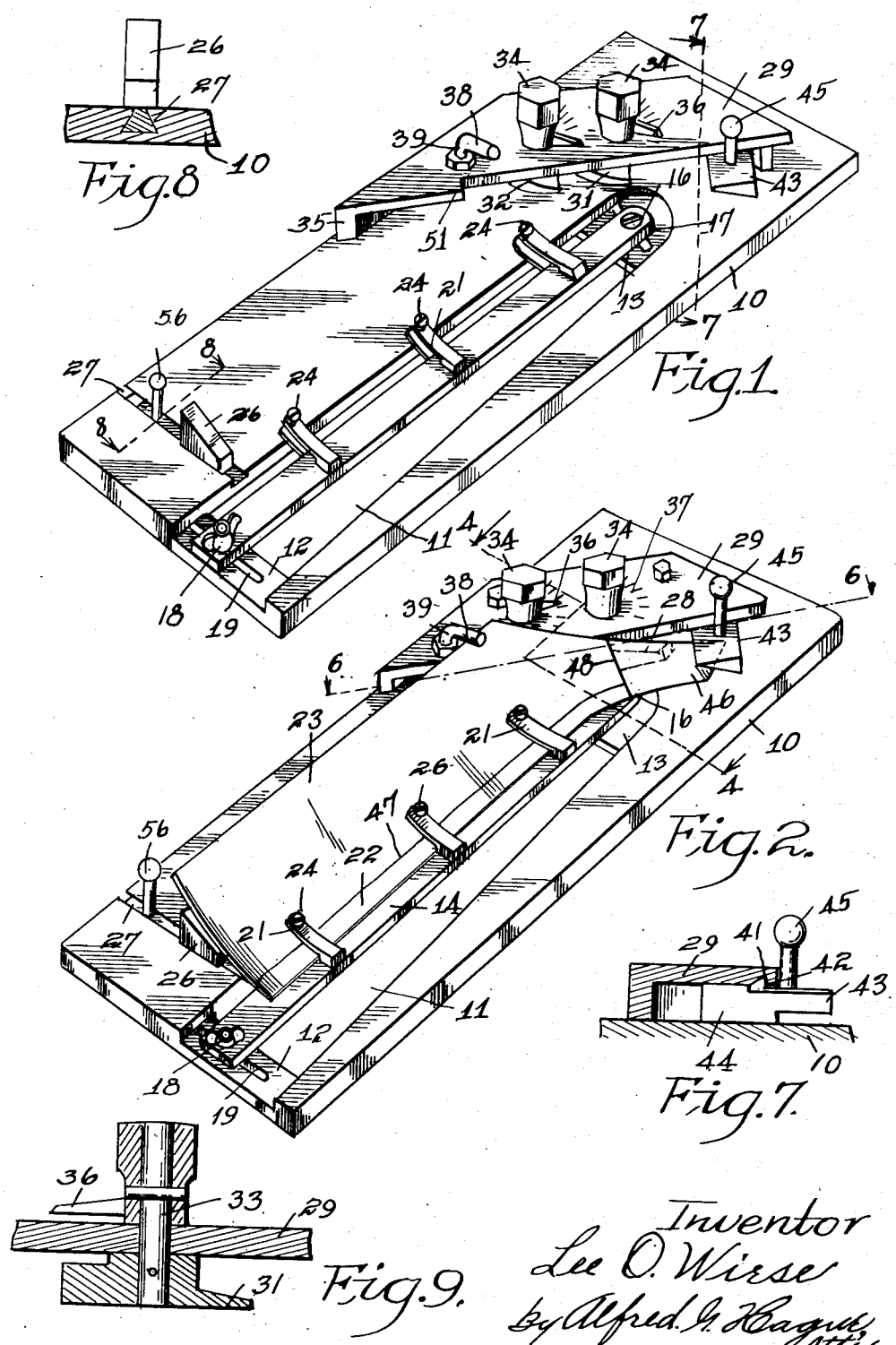

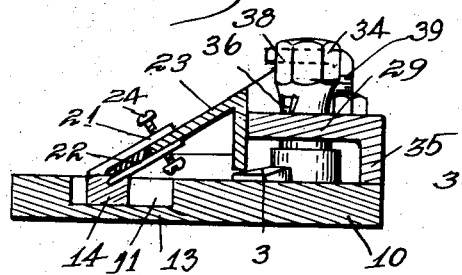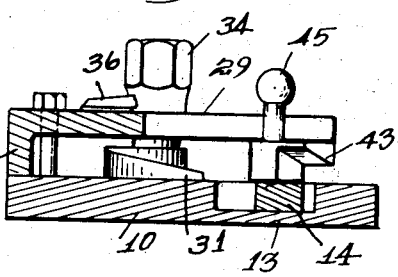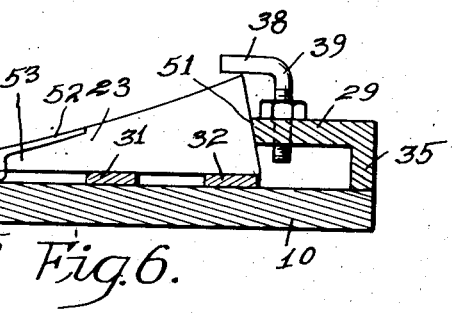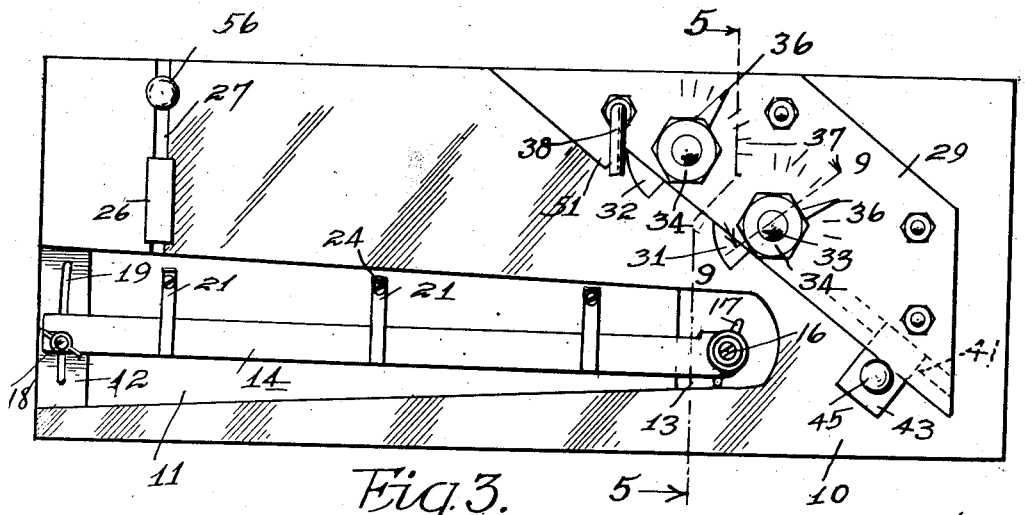

Patented Nov. 17, 1953

2,659,332

UNITED STATES PATENT OFFICE 2,659,332

WELDING JIG FOR REPAIRING PLOWSHARES

Lee O. Wiese, Perry, Iowa

Application November 12, 1949, Serial No. 126,871

4 Claims. (Cl. 113—99)

This invention relates to the repair of worn plow shares, and more particularly to the application of repair points and cutting edges to previously formed edges of a worn plow share, the repair elements above referred to usually consist of a renewal cutting edge, consisting usually of a long and slender bar of steel having one edge sharpened and its other shaped to approximately fit the contour of the previously formed edge of the plow share to which it is to be applied, and a repair point usually in the form of a drop forging, to replace the worn point which has been previously removed, the parts being fixed in position, preferably by arc welding. A considerable amount of difficulty has been experienced in the proper alignment of this type of repair elements with the edges to which they are to be attached, and for holding them during the welding operation, so that when welded they will have the proper shape to produce the proper draft or "suck."

It is therefore the object of my invention to provide a simple, durable and inexpensive device adapted to rigidly clamp and firmly hold the repair element to the desired position, while being welded, and so constructed and arranged that any person having experience in arc welding can easily and quickly set the repair elements, even when applied to plow shares of various shapes and sizes.

A further object of my invention is to provide a device in the nature of a jig having adjustable clamps in which the repair elements may be easily and quickly placed, to temporarily support the repair elements in proper position relative to the plow share while being welded.

My invention consists in the construction, arrangement and combination of the various parts of the device whereby the objects contemplated and attained as hereinafter more fully set forth, pointed out in my claims and illustrated in the accompanying drawings, in which:

Figure 1 is a perspective view of my improved welding jig for plow shares.

Figure 2 is a perspective view of the same showing a plow share mounted thereon with the repair elements clamped to position to be welded.

Figure 3 is a plan view of my improved welding jig.

Figure 4 is a detail sectional view taken on the line 4—4 of Figure 2.

Figure 5 is a detail sectional view taken on the line 5—5 of Figure 3.

Figure 6 is a sectional view taken on the line 6—6 of Figure 2.

Figure 7 is a detail sectional view taken on the line 7—7 of Figure 1.

Figure 8 is a detail sectional view taken on the line 8—8 of Figure 1.

Figure 9 is a detail sectional view taken on the line 9—9 of Figure 3.

Referring to the drawings I have used the reference numeral 10 to indicate the body, or surface plate, of my improved jig, said base being provided with a slot 11. The ends of the slot 11 are provided with bars 12 and 13 of less thickness than the body 10 to provide a guide for adjustably supporting a cutter supporting clamp bar 14, one end of said bar 14 being mounted on the bar 13 by means of a screw 16, adjustably mounted in a slot 17 while the other end of the bar is secured to the member 12 by means of thumb screw 18 adjustably mounted in a slot 19, the top surface of the bar 14 being substantially even with the top of the body 10. The top surface of the bar 14 is provided with a plurality of slotted fingers 21 for receiving the repair cutting edge 22, and supporting it to position in engagement with the forward edge of the plow share 23 supported above the body 10, with its adjoining edge also in said fingers. Set screws 24 serve to assist in the alignment of said adjoining edges.

A wedge 26 is mounted on a slide bar having a knob 30 and slidably mounted in a dovetailed groove 27 in the body 10 for supporting the outer end of the share 23. The landside portion 28 of the opposite end of the share 23 adjoins the inner edge of a fixed guide table 29, supported above the body by a flange 35, with the lower edge of said landside resting on a pair of segmental wedges 31 and 32, as illustrated in Figure 6. Each of the wedges being rotatably mounted in the table 29 by vertical shafts 33, the upper end of each shaft 33 having preferably a hexangular head 34 for receiving a wrench, by means of which the wedges may be adjusted. Each of said heads is provided with an index member 36 adapted to travel over a graduated scale 37 mounted on the top of the table 29. Mounted on the back edge of the inner edge of the table 29 is gage 38 having a shank 39 threaded into the table 29 whereby the member 38 may be elevated or lowered relative to the base 10 simply by rotating the shank. The gage 38 provides means for holding the share against upward movement and provides means for automatically determining the proper inclination of the plow share relative to the surface plate 10.

The forward and outer end of the table 29 has its under surface provided with a groove 41, adapted to slidably receive a flange 42 formed on the upper surface of the movable clamp 43 (see Figure 7), the inner end of the clamp comprising a block 44 adapted slidably to engage the under surface of the table 29 and the upper surface of the plate 10. The under surface of the member 43 being inclined to engage the top surface of the repair point 46 when the parts are assembled as hereinafter made clear.

In the practical operation of my improved device in connection with the application of the repair cutting edge 22 and the repair point 46 to the previously prepared edges 47 and 48 of the share 23 formed by the removal of the worn edge and point by means of a cutting torch or otherwise, assuming that the screws 16 and 18 have been loosened and that the bar 14 is moved to its forward position of movement and that the wedges 26 and 43 are at their outer positions of movement and that the gage 38 is properly adjusted for height for the type of share to be repaired.

The repair element 22 is then placed in the fingers 21, after which the share 23 is placed on the surface plate 10 with its landside 28 firmly against the inner edge of the table 29 with its head 49 against the shoulder 51, formed on the table 29. The point 46 then may be placed in position with the flange 52 above the nose 53 of the landside portion 28. The point 46 having its pointed end 54 and its gage lug 55 resting on the plate 10, this automatically adjusts the angle of the top edge of the point relative to the surface plate, the top edge of the nose 53 will still be below the flange 52. The landside end of the share is then elevated until its back edge engages the gage 38 and the nose 53 engages the flange 52, by means of the wedges 31 and 32 being rotated beneath the lower edge of the landside 28, the nose 46 is clamped in position by sliding the clamp 43 inwardly by means of the knob 45 with its inclined surface engaging the top and forward end of the repair point. The wedge 26 may then be moved inwardly to engage the under surface of the outer end of the share by means of the knob 56. The bar 14 may then be moved inwardly until the back edge of the element 22 joins the edge 47 of the share with said edge 47 in the fingers 21, the set screws 24 may then be adjusted, if necessary, to align the adjoining edges vertically. The screws 16 and 18 may then be set to lock the bar 22 in position. Inasmuch as the top surface of the bar 22 is even with the top surface of the plate 10 it will be seen that the angularity of the repair elements will be automatically adjusted by simply placing the parts in position on the surface plates in their proper sequence. The parts may then be easily and quickly fixed in position by welding.

The device is equally adapted to be used with plow shares of various sizes and shapes, said variations consisting of shares of various lengths, usually from 12" to 16" in length in the landside lengths from 9" to 11", the angularity of the cutting edges, of some makes of shares, relative to the vertical plans of their respective landside portion also vary as much as 3" on the free end of the cutting edge; for this reason the landside of all types of shares are always clamped against the inner edge of the table, the edge 47 will then assume various angles relative to the landside portion for that reason the bar 22 is made adjustable.

The adjustable gage 38 and the wedges 31 and 32 provide means for adjusting the angle of the top surface of the share relative to the surface plate, to give the proper "draft" or "suck" to the share. Under certain conditions the graduated scales 37 are of an advantage, assuming that the lower edge of the landside 28 is not badly worn at its heel and a repair point of a type not provided with the gage lug 55 is to be applied. Then the wedges 31 and 32 may be adjusted before placing the landside of the plow share thereon to give the proper inclination of the share relative to the surface plate, by simply adjusting the index members 36 to predetermined position on the scales as pre-calculated for the type or model of share being repaired.

Thus it will be seen that I have invented a welding jig of comparatively simple and inexpensive construction, adapted to support all types and sizes of plow shares in commercial use, and of simple operation so that any person provided with an arc welding outfit and capable of operating the same, can easily and quickly do a good and efficient job of repairing a plow share when standard pre-shaped repair elements are used to replace the corresponding worn parts.

I claim:

1. A device for supporting a plow share, from which its worn cutting edge and point have been removed, and its replacement parts in proper alignment to be welded together, comprising an elongated base including front and back edges, a diagonally mounted upright portion to provide a landside guide near one end of said base and a longitudinal recess in its upper surface near its front edge, a clamp bar mounted in said recess, means pivoting one end of said clamp bar to said base near the front end of said landside guide, to permit the free end of said bar to swing in a horizontal plane forwardly and rearwardly, the upper surface of said bar having a plurality of upwardly and rearwardly inclined and slotted fingers for receiving simultaneously a replacement cutting edge and the adjoining edge of said share, means mounted on said base for adjusting the inclination of said share relative to said base, means for clamping the landside of the share adjacent to said guide with its front edge over hanging said recess, stop devices for fixing the share against rearward movement and means for fixing the movable end of said clamp bar to any one of a number of adjustments.

2. A device for supporting a plow share, from which its worn cutting edge and point have been removed, and its replacement parts in proper alignment to be welded together, comprising an elongated base including front and back edges and a longitudinal recess near its front edge, a shelf supported by and above said base having its inner edge mounted diagonally near one end of said recess to provide a landside guide, the rear end of said guide having an offset portion to form a stop, that portion of the shelf adjacent thereto having a vertically adjustable gage in its upper end terminating in a laterally extending portion overhanging said guide edge, a point clamp adjustably mounted between the front end of said shelf and said base to move longitudinally of said guide, rotatably mounted wedges spaced apart and beneath said shelf between said landside stop and point clamp for supporting and elevating the back and forward ends of the landside independently when adjacent to said landside guide, a clamp bar mounted in said recess to move forwardly and rearwardly with its upper surface substantially in a common plane to the upper surface of said base, said bar having upwardly and rearwardly inclined clamp devices for simultaneously supporting a cutting edge of a share supported on said base with its landside adjacent to said guide edge and its forward edge over said recess, and means for fixing said clamp bar in any one of a number of its positions of movement.

3. In a device for supporting a plow share, from which its worn cutting edge and point have been removed, and its replacement parts in proper alignment to be welded together, comprising an elongated base including front and back edges and a longitudinal recess in its upper surface near its front edge, a shelf supported by and above one end of said base, said shelf having its inner edge supported diagonally near one edge of said recess, to provide a landside guide near one end of said recess including a landside stop near its back edge, a point clamp adjustably mounted beneath the front end of said shelf to slide longitudinally of said guide edge, rotatably mounted wedges spaced apart and beneath said shelf between said landside stop and point clamp for supporting and elevating the back and forward ends of the landside independently when adjacent to said landside guide, adjustable means mounted on said shelf near said landside stop for limiting the upward movement of the back end of the landside, a clamp bar mounted in said recess to move forwardly and rearwardly with its upper surface substantially in a common plane to the upper surface of said base, said bar having upwardly and rearwardly inclined clamp devices for supporting a replacement cutting edge in alignment with the forward edge of a share, means for fixing said clamp bar in any one of a number of its positions of movement and a wedge mounted to move forwardly and rearwardly in suitable ways in said base near the free end of a share.

4. In a device of the class described, an elongated base, including front and back edges, a shelf supported by and above one end of said base, said shelf having its inner edge supported diagonally to provide a landside guide including a landside stop near its back edge, a point clamp to move longitudinally thereof beneath the forward end of said shelf, rotatably mounted wedges spaced apart and beneath said shelf and between said landside stop and point clamp for supporting and elevating the back and front ends of the landside independently, means rotatably mounting said wedges in said shelf, an index carried by each wedge rotating means and a corresponding indicia carried by said shelf for indicating the inclination of the lower edge of a landside supported by said wedge relative to the base, a clamp bar having one end pivoted to said base near the forward end of said shelf having its upper face provided with a plurality of upwardly and rearwardly inclined and slotted fingers for receiving simultaneously a replacement cutting edge and the adjoining edge of said share and for supporting the share in operative position with its landside adjacent to said landside guide.

LEE O. WIESE.

References Cited in the file of this patent

UNITED STATES PATENTS

| Number | Name | Date |
| --- | --- | --- |
| 226,326 | Killefer | Apr. 6, 1880 |
| 633,921 | Strom | Sept. 26, 1899 |
| 1,503,406 | Wheeler | July 29, 1924 |
| 2,396,452 | Widmark | Mar. 12, 1946 |